United States Patent [19]

Komossa et al.

[11] Patent Number: 4,765,445
[45] Date of Patent: Aug. 23, 1988

[54] SHOCK ABSORBER

[75] Inventors: Werner Komossa, Börnsen; Peter Brand, Hamburg, both of Fed. Rep. of Germany

[73] Assignee: Körber AG, Hamburg, Fed. Rep. of Germany

[21] Appl. No.: 31,252

[22] Filed: Mar. 26, 1987

[30] Foreign Application Priority Data

Apr. 12, 1986 [DE] Fed. Rep. of Germany ....... 3612397
Aug. 30, 1986 [DE] Fed. Rep. of Germany ....... 3629644

[51] Int. Cl.⁴ ................................................ F16F 9/46
[52] U.S. Cl. ..................... 188/299; 188/322.15; 188/322.22
[58] Field of Search ............. 188/299, 322.15, 322.22, 188/317, 319; 251/30.04, 31; 137/221

[56] References Cited

U.S. PATENT DOCUMENTS

| | | | |
|---|---|---|---|
| 3,603,612 | 9/1971 | Hill et al. | 188/299 |
| 4,310,172 | 1/1982 | Claude et al. | 280/703 |
| 4,313,529 | 2/1982 | Kato et al. | 188/299 |
| 4,527,676 | 7/1985 | Emura et al. | 188/299 |
| 4,645,043 | 2/1987 | Imaizumi | 188/322.15 |
| 4,645,044 | 2/1987 | Kato et al. | 188/322.15 |

FOREIGN PATENT DOCUMENTS 3518327 11/1986 Fed. Rep. of Germany ...... 188/299
1130621 7/1957 France .
0173632 10/1982 Japan ............................. 188/322.15

Primary Examiner—Andres Kashnikow
Assistant Examiner—Mark T. Le
Attorney, Agent, or Firm—Peter K. Kontler

[57] ABSTRACT

A shock absorber with a variable damping characteristic has a piston which is reciprocable in a cylinder to divide the oil-filled interior of the cylinder into two chambers. The chambers are connectable to each other by way of several passages including a first set for permitting the flow of damping fluid from one chamber into the other chamber through a first one-way valve in response to movement of the piston rod into the cylinder, and a second set of passages which permit the fluid to flow from the other chamber into the one chamber in response to extraction of the piston rod from the cylinder. The piston is further formed with several bypass channels which are adjacent one another and wherein the flow of fluid between the two chambers (either directly or by way of selected passages) is regulated by cores which are movable axially in response to energization of inductance coils or in response to dissipation of energy by springs. The number of energized coils determines the rate of fluid flow by way of one or more bypass channels to thus influence the damping characteristic of the shock absorber.

22 Claims, 3 Drawing Sheets

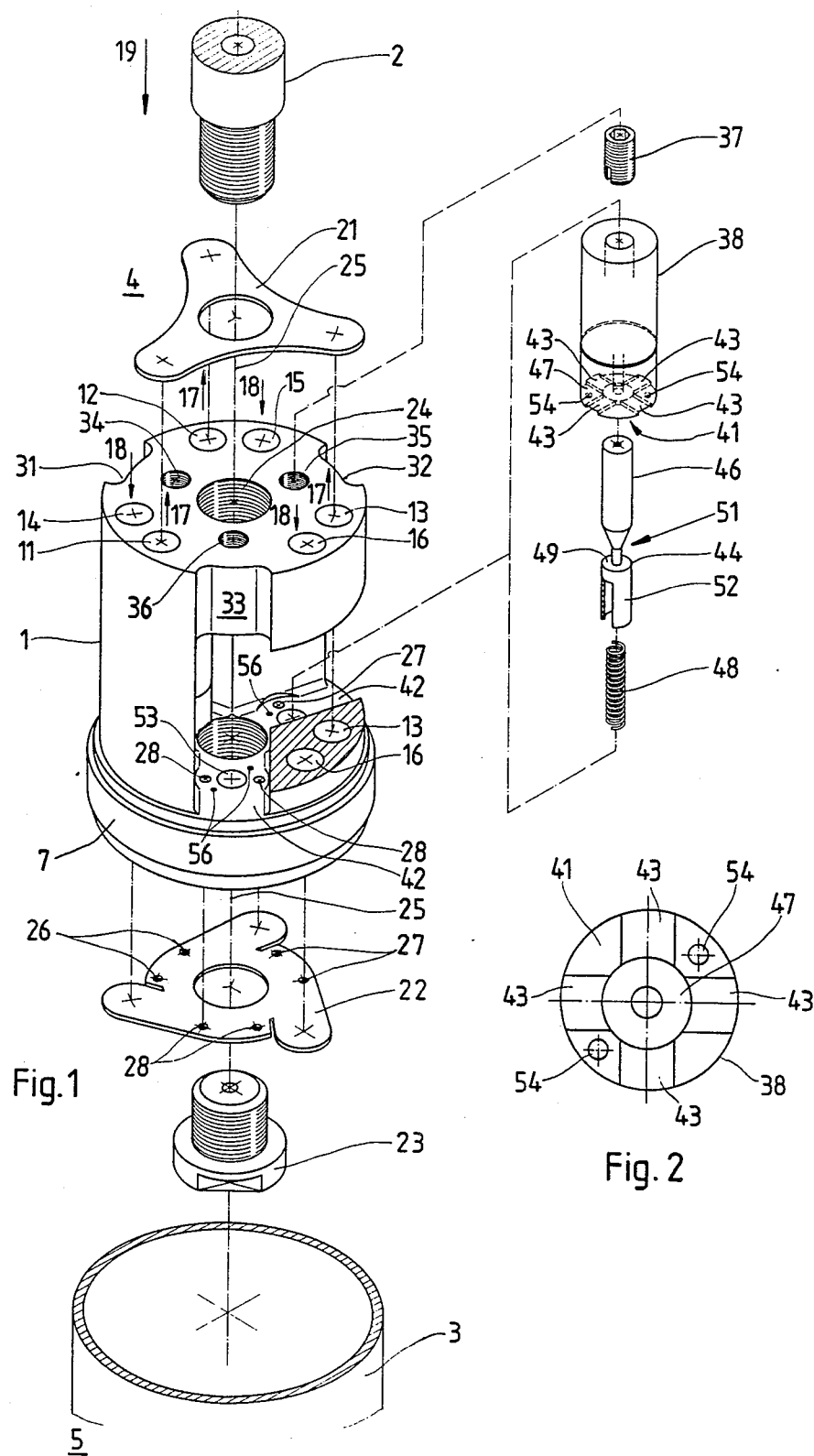

SHOCK ABSORBER

BACKGROUND OF THE INVENTION

The invention relates to shock absorbers, especially for use in motor vehicles, and more particularly to improvements in shock absorbers having adjustable damping characteristics.

It is known to provide the piston of a shock absorber with one or more passages for the flow of oil or another damping fluid between the chambers at the axial ends of the piston in the interior of the shock absorber cylinder, and to further provide the piston with a bypass channel wherein the flow of damping fluid from one of the chambers into the other chamber or vice versa is regulated by an electrically controlled valve. The damping characteristic of the shock absorber is changed in response to opening or closing of the valve. The arrangement is normally such that the extent to which the valve is opened determines the rate of fluid flow through the bypass channel. Reference may be had to French Pat. No. 1,130,621.

OBJECTS AND SUMMARY OF THE INVENTION

An object of the invention is to provide a shock absorber whose damping characteristic can be altered in a simple but efficient way.

Another object of the invention is to provide a shock absorber whose damping characteristic can be altered between a desired number of values even though it need not employ adjustable valves.

A further object of the invention is to provide a vehicle suspension system which employs one or more shock absorbers embodying the above outlined features.

An additional object of the invention is to provide a shock absorber wherein the means for regulating the rate of fluid flow between the chambers at opposite axial ends of the piston in the shock absorber cylinder occupies little room and can be connected with an external source of electrical energy in a simple and space-saving manner.

Still another object of the invention is to provide the shock absorber with a novel and improved arrangement of bypass means for the flow of oil or another damping fluid between the chambers in the cylinder and with novel and improved means for regulating the flow of fluid through such bypass means.

A further object of the invention is to provide a novel and improved piston for use in the above outlined shock absorber.

Another object of the invention is to provide a shock absorber wherein the means for regulating the flow of fluid between the chambers can react practically instantaneously and whose energy requirements are low.

An additional object of the invention is to provide a shock absorber wherein the means for regulating the flow of damping fluid through the bypass means can be readily installed in and rapidly removed from the piston.

A further object of the invention is to provide a shock absorber wherein the passage or passages for the flow of the major part of a damping fluid between the chambers can form part of the bypass means.

One feature of the present invention resides in the provision of a shock absorber with a variable damping characteristic which can be used with particular advantage in motor vehicles. The improved shock absorber comprises a hollow cylinder which defines an internal space for confinement of at least one damping fluid (e.g., oil) and has a first end, a second end and an internal surface surrounding the space, a piston rod which sealingly extends through one end of the cylinder, and a piston which is reciprocable in the cylinder by the piston rod and is in sealing engagement with the internal surface of the cylinder to thus divide the internal space into a first and a second chamber with one chamber adjacent the one end and the other chamber adjacent the other end of the cylinder. The piston has at least one passage for the flow of damping fluid between the two chambers and a plurality of neighboring bypass channels which also extend between the two chambers. The shock absorber further comprises electrically operated means for regulating the flow of damping fluid through the channels.

The bypass channels are or can be parallel to each other, and they may be equidistant from the axis of the piston and also equidistant from one another as seen in the circumferential direction of the piston.

At least one of the bypass channels has a fluid metering portion (e.g., a set of grooves) and the regulating means includes a mobile regulating element (such as a circular edge of a reciprocable armature) for controlling the flow of fluid through the metering portion.

The regulating means comprises inductors having mobile armatures or cores which act as valving elements for the bypass channels, and energizable coils or windings which are arranged to move the armatures and to thereby change the rate of flow of damping fluid by way of the respective bypass channels. Means are provided to energize the coils so as to move the respective armatures to or from positions in which the damping fluid is free to flow through the respective bypass channels. The coils are or can be adjacent each other, and each inductor can further comprise a coil spring or other suitable means for yieldably biasing the armatures to positions in which they seal or expose the respective bypass channels.

The coils can be equidistant from the axis of the piston and from each other (as seen in the circumferential direction of the piston).

The piston can be provided with at least one first passage for the flow of damping fluid from one of the chambers into the other chamber, and with at least one second passage for the flow of damping fluid from the other chamber into the one chamber. In accordance with a presently preferred embodiment of the invention, the piston has pairs of neighboring first and second passages, and such pairs of passages can be equidistant from the axis of the piston as well as from one another (as seen in the circumferential direction of the piston). Safety or pressure relief valve means is provided to control the flow of damping fluid through the passage or passages of the piston. Such safety valve means includes a first safety valve for each first passage and a second safety valve for each second passage. The arrangement is preferably such that each safety valve which controls the flow of damping fluid into the first chamber (adjacent the one end of the cylinder) opens in response to a fluid pressure which is less than the pressure required to open a safety valve which controls the flow of damping fluid into the second chamber. In other words, the resistance to a lengthening of the shock absorber (drawing of the piston rod out of the cylinder)

is more pronounced than the resistance to further penetration of the piston rod into the cylinder.

The regulating means can comprise a mobile needle-like core or armature for each bypass channel or for each set of two or more bypass channels. The coils of the inductors can be coaxial and their common axis can coincide with the axis of the piston. Alternatively, the axes of the coils can be inclined with reference to the piston axis; for example, the axes of the coils can be disposed at right angles to the axis of the piston.

The novel features which are considered as characteristic of the invention are set forth in particular in the appended claims. The improved shock absorber itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is an exploded perspective view of a shock absorber which embodies one form of the invention and wherein the piston is formed with three pairs of bypass channels;

FIG. 2 is an enlarged bottom plan view of a detail in the shock absorber of FIG. 1;

DESCRIPTION OF THE PREFERRED EMBODIMENTS

Figure 3:
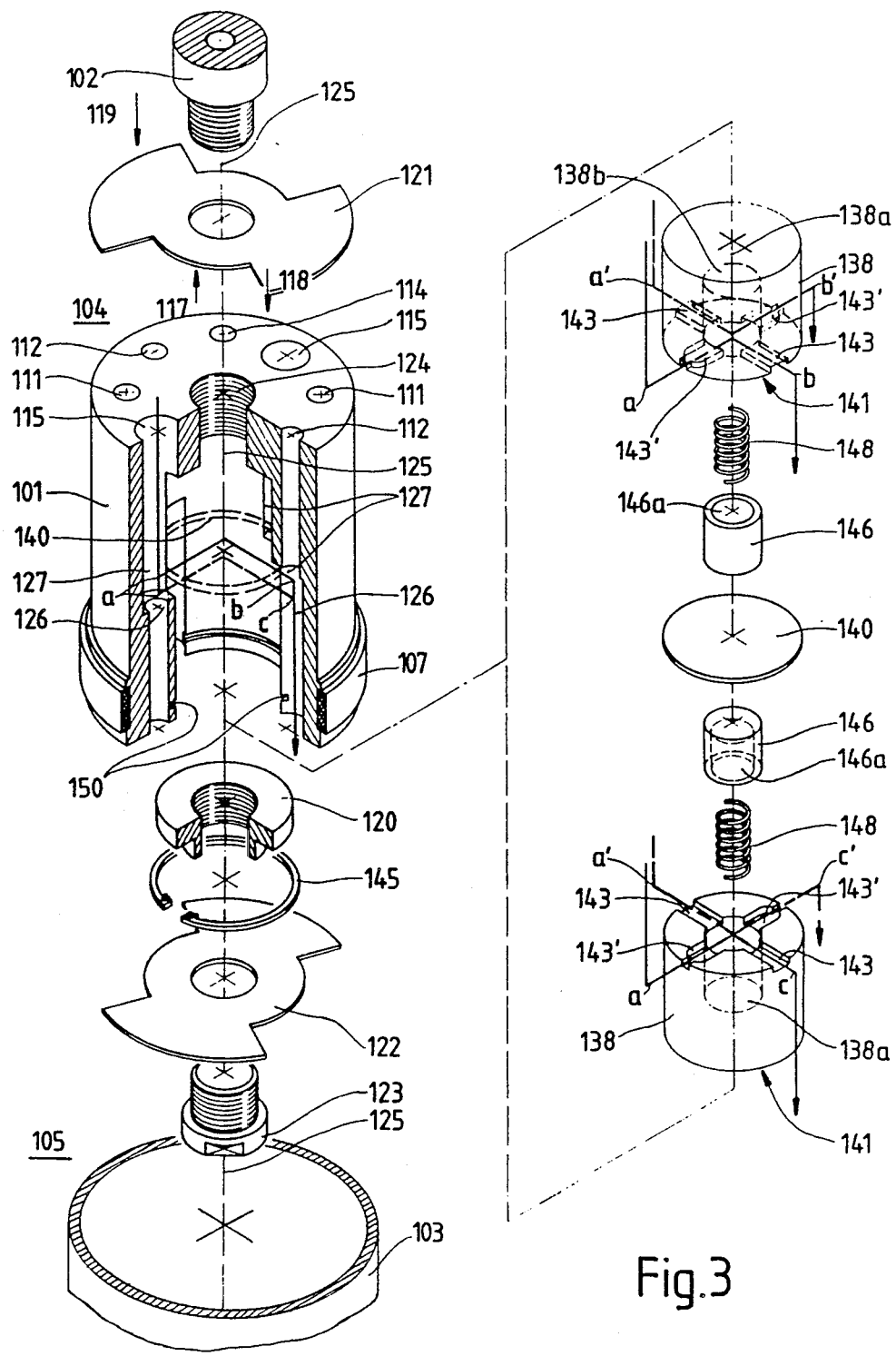
FIG. 3 is an exploded perspective view of a modified shock absorber with two coaxial excitable inductor coils.

Referring first to FIGS. 1 and 2, there is shown a shock absorber comprising a piston 1 which is connected to a piston rod 2 and is in sealing engagement with the internal surface of a hollow cylinder 3. The piston rod 2 extends through the upper end wall (not specifically shown) of the cylinder 3 and is in sealing engagement with such end wall. The piston 1 divides the internal space of the cylinder 3 into a first chamber 4 which is adjacent the upper end wall and a second chamber 5 which is adjacent the lower end wall of the cylinder. The chambers 4 and 5 are filled with a damping fluid (normally oil). The piston 1 carries a ring seal 7 which is in sealing contact with the internal surface of the cylinder 3.

The shock absorber which is shown in FIG. 1 is somewhat similar to that which is disclosed in the co-pending patent application Ser. No. 894,395 filed Apr. 11, 1984 by Obstfelder et al. for "Self-adjusting single- or twin-tube shock absorber" (continuation of Ser. No. 599,242 filed Apr. 11, 1984, now abandoned). The disclosure of Ser. No. 894,395 is incorporated herein by reference.

The piston 1 is formed with three pairs of parallel passages 11, 14; 12, 15; 13, 16. The passages 11 to 13 serve to convey damping fluid in the direction of arrows 17, i.e., from the chamber 5 into the chamber 4, and the passages 14–16 serve to convey damping fluid in the direction of arrows 18 (from the chamber 4 into the chamber 5). When the damping fluid flows in the direction of arrows 17 (from the chamber 5 into the chamber 4), the piston rod 2 moves with reference to the cylinder 3 in the direction of arrow 19, i.e., in a direction to increase the volume of the chamber 4 and to simultaneously reduce the volume of the chamber 5. This amounts to a reduction of the overall length of the shock absorber. If the piston rod 2 is pulled upwardly, as seen in FIG. 1, the volume of the chamber 4 decreases with a simultaneous increase of the volume of the chamber 5, and the damping fluid then flows through the passages 14–16 in the direction of arrows 18.

A first safety or pressure relief valve 21 is provided to control the flow of damping fluid through the passages 11–13 (into the chamber 4), and a second safety or relief valve 22 is provided to control the flow of damping fluid by way of the passages 14–16 (into the chamber 5). In other words, the valve 21 controls the flow of damping fluid during a reduction of the overall length of the shock absorber whereas the valve 22 controls the flow of damping fluid when the piston rod 2 is being extracted from the cylinder 3. The valves 21 and 22 are one-way valves, i.e., the valve 21 does not permit the damping fluid to flow from the chamber 4 into the passages 11–13, and the valve 22 does not permit the damping fluid to flow from the chamber 5 into the passages 14–16.

The valves 21 and 22 are preferably dimensioned in such a way that the wings of the valve 21 yield to a lesser pressure than the wings of the valve 22, i.e., the shock absorber is "softer" during a reduction of its overall length and is "harder" when the piston rod 2 is being extracted from the cylinder 3.

The reference character 23 denotes a threaded fastener which is used to separably secure the valve 22 to the underside of the piston 1. The lower end portion of the piston rod 2 has external threads which mate with internal threads in the tapped axial bore 24 of the piston 1 whereby a shoulder of the piston rod 2 biases the central portion of the upper valve 21 against the upper end face of the piston.

The three pairs of passages 11, 14 and 12, 15 and 13, 16 are equidistant from the axis 25 of the piston 1 and are equidistant from each other in the circumferential direction of the piston.

In accordance with a feature of the invention, the piston 1 is further formed with three pairs of parallel auxiliary passages 26, 27 and 28 (hereinafter called bypass channels) which are equidistant from the axis 25 and are also equidistant from one another in the circumferential direction of the piston. The shock absorber further comprises electrically operated means (inductors or iron-core coils) which are used to regulate the flow of damping fluid between the chambers 4 and 5 by way of the channels 26, 27 and 28. The regulating means are operable to establish paths for the flow of damping fluid between the chambers 4 and 5 in addition to that flow which takes place by way of the passages 11 to 16, and such regulation is relied upon to change the damping characteristic of the shock absorber.

Each inductor comprises an energizable coil 38 (actually a cylindrical casing or housing for an inductor winding) which is inserted sideways through the corresponding peripheral cutout or recess 31, 32 or 33 of the piston 1 at a level above the ring seal 7 and is retained in the piston by a screw 37 so that the axis of the inserted coil 38 is parallel to the axis 25. The screws 37 extend into tapped bores 34, 35 and 36 of the piston 1.

The construction of one inductor is shown on a larger scale in the upper right-hand portion of FIG. 1. The piston 1 has three internal surfaces 42, one for each of the three coils 38, and each coil has an underside 41 which rests on the respective surface 42 of the piston and has a cruciform array of grooves 43 (see FIG. 2). The rate at which the damping fluid can flow in the grooves 43 is determined by the axial position of the respective elongated armature or core 46 which has a fluid flow controlling edge 44. The armature 46 is yieldably biased into the axial bore 47 of the respective coil 38 by a resilient element in the form of a coil spring 48 which tends to push the armature upwardly, as seen in FIG. 1, and reacts against the piston 1. When the winding in the coil 38 is energized, the armature 46 is compelled to move downwardly against the opposition of the respective coil spring 48 so that damping fluid can flow between the chambers 4 and 5 by way of the respective bypass channels 26, 27 or 28 because the edge 44 then permits the fluid to flow in the adjacent radially extending channels 43 at the underside 41 of the coil 38.

The design of the valve 22 is such that only its wings flexed in response to increasing pressure of damping fluid in the passages 14 to 16 so that the wings move away from the lower ends of the respective passages 14–16 when the piston rod 2 moves upwardly. The design of the valve 21 is analogous, i.e., the wings of the valve 21 are flexed away from the upper ends of the respective passages 11–13 when the pressure of damping fluid in these passages rises above the pressure in the chamber 4 while the piston 1 moves downwardly. The windings in the coils 38 are energized individually, in pairs or all of them, depending upon the desired change of damping action which is furnished by the piston 1 in conjunction with the valve 21 or 22. In other words, the quantity of damping fluid which can flow between the chambers 4 and 5 in addition to that fluid which flows through the passages 11–13 or 14–16 is dependent upon the number of windings which are energized at such time.

If the winding in a coil 38 is deenergized, the corresponding coil spring 48 immediately returns the respective armature or core 46 to its raised position in which the flow of damping fluid in the respective grooves 43 is interrupted, i.e., the armature 46 is propelled deeper into the bore or hole 47 of the adjacent coil 38. The shoulder 49 which is surrounded by the flow controlling edge 44 of the armature 46 is substantially flush with the respective surface 42 of the piston 1 when the armature 46 permits damping fluid to flow from the chamber 5, through a pair of channels 26, 27 or 28, through the respective peripheral recess 31, 32 or 33 of the piston 1 and into the chamber 4 or in the opposite direction. The shoulder 49 is disposed below a symmetrical annular constriction 51 of the armature 46. Such constriction allows for uniform distribution of damping fluid on its way into or from the respective bypass channels 26, 27 and 28. This reduces the likelihood of tilting and/or actual jamming of the armature 46 in its bore 47.

The upper portion of each coil spring 48 is confined in a sleeve-like lower portion 52 of the respective armature 46. The lower portion of the coil spring 48 and the lower portion of the sleeve 52 extend into a bore 53 which is provided therefor in the respective surface 42 of the piston 1. The entire armature 46 has an axial bore or hole, the same as the coil 38, in order to ensure that the fluid offers little or no resistance to axial movements of the armature in response to energization of the winding in a coil 38 or in response to dissipation of energy by the coil spring 48. The coil 38 carries positioning or locating pins 54 which project downwardly beyond the underside 41 and into complementary sockets 56 in the corresponding surface 42 of the piston 1. The locating pins 54 cooperate with the respective screw 37 to maintain the coil 38 in requisite position within the respective recess 31, 32 or 33. Each inductor controls two bypass channels 26, 27 or 28, and such inductors (including their coils and armatures) are equidistant from the axis 25 and from each other (in the circumferential direction of the piston). This also holds true for the pairs of passages 11, 14 and 12, 15 and 13, 16 and for the pairs of bypass channels 26, 27 and 28.

The just described construction of the inductors, their distribution in the piston 1 and the distribution of passages 11–16 and bypass channels 26–28 in the piston contributes to a compact design which is of considerable importance in shock absorbers for many types of motor vehicles.

FIG. 1 shows that the lowermost parts of the bypass channels 26, 27 and 28 extend through those portions of the relief valve 22 which are not flexed when the valve 22 permits damping fluid to flow into the chamber 5. This is desirable and advantageous because it renders it possible to alter the rate of flow of damping fluid through the bypass channels by the simple expedient of replacing the illustrated valve 22 with a valve having larger- or smaller-diameter channels 26, 27, 28 therein while the mounting and design of the inductors in the piston 1 remain unchanged. Thus, the manner and the rate at which the edges 44 cooperate with the undersides 41 of the respective coils 38 (to permit or prevent the flow of damping fluid through the corresponding grooves 43) can remain the same but the rate of flow of fluid through the bypass channels will be changed nevertheless by the simple expedient of replacing the valve 22 with a valve having larger or smaller channels 26, 27 and/or 28 therein. The valve 22 can be exchanged in a time-saving manner by the simple expedient of separating the threaded fastener 23 from the piston 1.

The diameters of all bypass channels 26–28 may but need not be the same. For example, the arrangement may be such that the ratio of the diameters of channels 26, 27 and 28 is 1:2:4 or any other desired ratio. This contributes to greater versatility of the shock absorber, i.e., it is possible to alter its damping characteristic within a very wide range. If the number of bypass channels which permit the damping fluid to flow between the chambers 4 and 5 is increased, the shock absorber becomes "softer". The shock absorber is relatively "hard" if all or nearly all bypass channels are sealed.

It is within the purview of the invention to modify the illustrated inductors in a number of ways. For example, each armature 46 can closely resemble or constitute a slender needle so that its mass is negligible and such needle-like armature can even more rapidly react to energization of the winding in the respective coil 38 (in order to move to its open or flow-permitting position) or to dissipation of energy by the respective coil spring 48 or other suitable biasing means.

The distribution of passages 11–16 and bypass channels 26–28 in two circles around the axis of 25 of the piston 1 contributes to compactness of the piston because the passages and channels occupy little room.

The aforedescribed mode of regulating the flow of damping fluid into the grooves 43 of the coils 38 contributes to simplicity of the improved shock absorber in spite of the fact that its damping characteristic can be changed within a wide range and in a simple way. This is often desirable and necessary, for example, to conform the damping characteristic to the requirements of a particular motor vehicle. It can be said that each pair of bypass channels has a metering portion (grooves 43) and the regulating means for these channels comprises a regulating or control portion 44 which (i.e., whose position) determines the rate of fluid flow in the respective metering portion. The regulating or control portion can be selected independently of the metering portion so that it reacts practically instantaneously (either to energization of the winding in the coil 38 or to a dissipation of energy by the respective spring 48). A relatively small and lightweight regulating portion is desirable and advantageous because the energy requirements of the inductor are then minimal (i.e., it takes little energy to energize the winding to the extent which is necessary to shift the armature to its open position, and a relatively small and weak spring suffices to return the lightweight armature to its closing position in immediate response to termination of energization of the respective winding). All that counts is to ensure that energization of a winding will suffice to move the armature to its fully open position permitting the damping medium to flow at a maximum rate. If desired, the rate of fluid flow through the grooves 43 can be altered by employing suitable inserts or by replacing a coil 38 with a different coil. As a rule, the adjustment will preferably be such that the design of the inductors remains unchanged, e.g., one will alter the rate of fluid flow through the grooves and/or seal one or more grooves.

It is further clear that the functions of the windings in the coils 38 and spring 48 can be reversed, i.e., that the springs can be used to bias the armatures to open positions and the windings are then energized to move the armatures to closed or sealing positions. Still further, it is within the purview of the invention to provide each inductor with a first winding which is energized to move the respective armature to its open position and with a second winding which is energized to move the respective armature to its closed or sealing position. The illustrated design is preferred at this time because it contributes to greater simplicity, lower cost and lower energy requirements of the inductors.

The placing of inductors into the recesses 31–33 of the piston 1 at equal distances from each other and from the axis 25 also contributes to simplicity and compactness of the entire shock absorber. The axes of the coils 38 are parallel to the axis 25. As mentioned above, the provision of cruciform arrays of grooves 43 ensures uniform and symmetrical flow of damping fluid when the respective armatures 46 are shifted to their open positions.

The aforediscussed distribution of passages 11–16 in pairs at equal distances from the axis 25 and at equal distances from each other in the circumferential direction of the piston 1 also contributes to simplicity and compactness of the piston and of the entire shock absorber. The aforementioned design of the valves 21 and 22 (so that the valve 21 is more readily opened than the valve 22) is desirable and advantageous because it is normally preferred to design the shock absorber in such a way that its action is softer in response to penetration of the piston rod 2 deeper into the cylinder 3.

FIG. 3 shows a modified shock absorber wherein all such parts which are identical with or clearly analogous to the corresponding parts of the shock absorber of FIGS. 1–2 are denoted by similar reference characters plus 100. In this embodiment, the coils 138 of the inductors are coaxial and their common axis coincides with the axis 125 of the piston 101. The latter has pairs of passages 111, 112 for the flow of a damping fluid (arrow 117) from the chamber 105 into the chamber 104 (in response to opening of the relief or safety valve 121) when the piston rod 102 is caused to move in the direction of arrow 119, and two pairs of passages 114, 115 for the flow of damping fluid (arrow 118) from the chamber 104 into the chamber 105 in response to opening of the valve 122 (i.e., when the piston rod 102 is being extracted from the cylinder 103). The illustrated relief valves 121 and 122 are simple disc-shaped springs each of which has two wings or lobes, one for each pair of adjoining passages 111–112 or 114, 115. The resistance of the valve 121 to deformation is less pronounced than that of the valve 122, i.e., the shock absorber of FIG. 3 is relatively "soft" when its overall length is being reduced as a result of penetration of the piston rod 102 deeper into the internal space of the cylinder 103.

The externally threaded fastener 123 for the lower valve 122 mates with an internally threaded ring 120. The latter is held in the lower portion of the piston 101 by a split ring 145 received in an internal groove 150 of the piston. The upper valve 121 is held in position by the externally threaded lower end portion of the piston rod 102 which mates with threads in the tapped axial bore 124 of the piston 101. The shoulder of the piston rod 102 above the externally threaded portion then biases the central portion of the valve 121 against the upper end face of the piston 101.

The piston 101 is further formed with bypass channels 126 and 127 which communicate with intermediate portions of the passages 115 whose upper ends are always unobstructed (note the cutouts in the upper valve 121) as well as with intermediate portions of the passages 112 whose lower ends are always exposed (note the cutouts in the valve 122. The means for regulating the flow of damping fluid through the bypass channels 126 and 127 comprises two coaxial inductors having coils 138 whose common axis 138a coincides with the axis 125 of the piston 101. The actual windings are confined in the bodies of the coils 138, i.e., the coils 138 can be said to constitute housings or casings for the energizable windings of the respective inductors.

The upper coil 138 which is shown in the right-hand portion of FIG. 3 has an underside 141 which rests on a disc-shaped support 140 and is provided with a cruciform array of grooves 143 for damping fluid (normally oil). The upper side 141 of the lower coil 138 of FIG. 3 has a similar cruciform array of grooves 143 and abuts the underside of the disc-shaped support 140. The flow of damping fluid through the grooves 143 is regulated by the respective armature or core 146 which is biased into the axial bore or hole 138b of the respective coil 138 by a coil spring 148. When the winding in a coil 138 is energized, the respective armature 146 is shifted axially against the opposition of the spring 148 to allow damping fluid to flow through the respective grooves 143. The spring 148 is received in a bore 146a of the armature 146. At such time, the armature 146 penetrates deeper into the respective bore or hole 138b. The paths for the flow of damping fluid in response to movement of the upper armature 146 of FIG. 3 to open position are shown at a-b and a'-b', and the paths for the flow of damping fluid in response to energization of the winding in the lower coil 138 of FIG. 3 are indicated at a-c and a'-c'. When the regulating means of the shock absorber of FIG. 3 permits it, the damping fluid is free to flow between the invariably unobstructed upper portions of the passages 115 and the invariably unobstructed lower portions of the passages 112.

The internally threaded ring 145 cooperates with the split ring 150 to keep the coils 138 against axial movement in the piston 101.

Certain grooves 143 can receive calibrating inserts 143' or they can be formed to permit the damping fluid to flow therethrough at a predetermined rate.

When the winding in the upper coil 138 of FIG. 3 is energized, the bypass channels 126, 127 permit the damping fluid to flow between the passages 115, 112 at a first rate. This renders the shock absorber "softer" because a certain quantity of damping fluid is branched off from the passages 115 and flows in parallel thereto in the channel 127. If the winding in the lower coil 138 is also energized, additional fluid can flow between the passages 115, 112 via channel 126 so that the shock absorber is even softer. If the effective cross-sectional areas of grooves in the upper and lower coils 138 of FIG. 3 are different, one can increase the number of different values of the damping characteristic by appropriately selecting the number of energized windings as well as the individual windings. It is clear that the number of inductors in the shock absorber of FIG. 3 can be increased to three or more.

The axial bore in the hollow piston rod 102 serves to accommodate electrical conductors (not specifically shown) which are connected to the windings in the coils 138.

Figure 4:
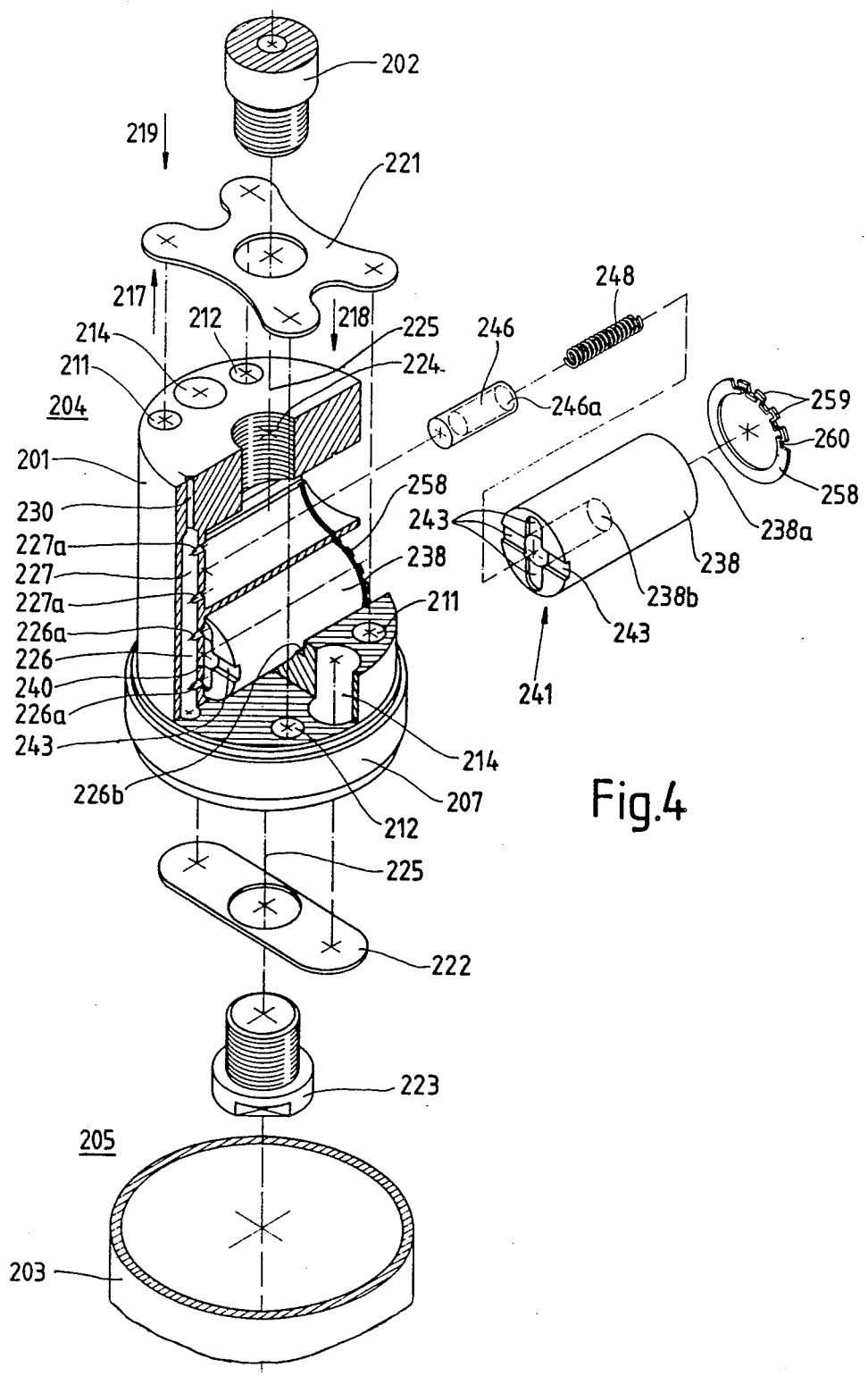
FIG. 4 is an exploded perspective view of a third shock absorber with two parallel inductor coils which extend at right angles to the axis of the piston.

The shock absorber which is shown in FIG. 4 constitutes a further modification of the shock absorber of FIGS. 1 and 2. All such parts of this shock absorber which are identical with or clearly analogous to the corresponding parts of the shock absorber of FIG. 1 are denoted by similar reference characters plus 200.

The axes 238a of the coils 238 forming part of the inductors (regulating means) in the shock absorber of FIG. 4 make an angle of 90 degrees with the axis 225 of the piston 201. The passages 211, 212 of the piston 201 convey damping fluid in the direction of arrow 217 (into the chamber 204) when the piston rod 202 moves in the direction of arrow 219, and the passages 214 convey damping fluid in the direction of arrow 218 (into the chamber 205) when the piston rod 202 is caused to penetrate deeper into the cylinder 203. The upper relief valve 221 differs from the lower relief valve 222 because the number of passages (211, 212) which convey fluid into the chamber 204 is greater than the number of passages 214 for the flow of fluid into the chamber 205. The valve 221 opens when the piston rod 202 penetrates into the cylinder 203 and the valve 222 opens when the piston rod 202 is moved upwardly, as seen in FIG. 4. The pressure to which the valve 221 responds is lower than the pressure which is required to open the valve 222, i.e., the shock absorber is softer when the piston rod 202 is in the process of penetrating into the cylinder 203. The threaded fastener 223 serves to separably hold the valve 222 at the underside of the piston 201. The upper valve 221 is held in operative position by the threaded lower end portion of the piston rod 202 which extends into the tapped axial bore 224 of the piston 201.

The piston 201 is formed with pairs of bypass channels 226a, 227a and 226b, 227b (only one of the two bypass channels 226b and none of the channels 227b can be seen) which respectively communicate with channels 226 and 227. The channels 226, 227 are coaxial and communicate with each other and are parallel to the axis 225 of the piston 201. The lower end of the composite channel 226, 227 communicates with the chamber 205, and the upper end of this composite channel communicates with the chamber 204 by way of a small-diameter bore 230 in the piston 201.

The coils 238 of the two inductors are mounted one above the other so that their axes 238a extend at right angles to the axis 225 of the piston 201. The latter can contain three or more inductors; only two inductors have been shown in FIG. 4 for the sake of simplicity. The end faces 241 of the coils 238 abut the inner side of a wall 240 which forms part of the piston 201, and each end face 241 has a cruciform array of grooves 243. Each coil 238 has an axial bore or hole 238b for the respective armature 246 and coil spring 248. The channels 226a and 227a are provided in the wall 240, i.e., adjacent the end faces 241 and grooves 243 of the respective coils 238. The diameters of the channels 226a, 227a are calibrated to permit the damping fluid to pass between the grooves 243 and the channels 226, 227 at a preselected rate. Energization of windings in the coils 238 entails a retraction of the respective armatures 246 against the opposition of the corresponding springs 248 in the bores or holes 238b so that the armatures permit the damping fluid to flow in the respective grooves 243. The fluid flows from the chamber 205, through the channels 226, 227, the respective channels 226a and/or 227a, additional channels 226b, 227b (three of these not shown in FIG. 4) and into the chamber 204 or vice versa.

The character 258 denotes an andulate annular spring which acts not unlike a diaphragm spring and urges the end face 241 of the respective coil 238 against the wall 240 of the piston 201. A similar second diaphragm spring is provided for the other coil 238. The tooth spaces or clearances 260 between the teeth 258 of the illustrated spring 258 communicate with the aforementioned (non-illustrated) bypass channels 226b, 227b and with the chamber 204.

The conductor means for connecting the windings in the coils 238 with a source of electrical energy extend through the axial bore or hole of the piston rod 202.

If the winding in the lower coil 238 is energized, a certain quantity of damping fluid flows from the channel 226 to flow in parallel with the fluid in the passages of the piston 201 and into the chamber 204 in order to soften the damping characteristic of the shock absorber as a result of the provision of an additional path for the flow of fluid between the chambers 204 and 205. If the winding of the upper coil 238 is energized in addition to the winding in the lower coil 238, the characteristic of the shock absorber undergoes an additional change, i.e., the shock absorber will become even softer because an additional stream of fluid flows between the channel 227 and the chamber 204 in parallel with the stream or streams flowing through the passages of the piston 201. The damping characteristic can be altered stepwise between a number of values depending upon the number of inductors. Pairing of effective cross-sectional areas of the channels 226a and 227a renders it possible to fully open or to fully seal the bypass channels in the piston 201 in five stages.

Means for transmitting signals to energize or deenergize the windings of the coils 38, 138 and 238 under certain circumstances (e.g., in response to movement of sprung and unsprung masses in a vehicle) are disclosed, for example, in U.S. Pat. Nos. 4,310,172, 3,603,612, 4,527,676 and 4,313,529.

A feature which is common to all of the described and illustrated embodiments of the improved shock absorber is that the provision of several bypass channels does not entail an undue increase of the dimensions of the piston, i.e., that the dimensions of the piston and of the cylinder therefor need not be increased on account of the provision of two or more bypass channels with their regulating means.

Another feature which is common to all illustrated and described embodiments is that the damping characteristic of the shock absorber can readily conform to the requirements in a particular suspension system, particularly in the suspension system of a motor vehicle. The regulating means can react practically instantaneously which is necessary and desirable in vehicles wherein the damping action is regulated in dependency on the nature of terrain and/or other parameters in a fully automatic way. Moreover, the energy requirements of the regulating means are very low and the characteristic curve of the shock absorber can readily conform to a desired curve by appropriate selection and design of safety or relief valves which are used in conjunction with the passages in the piston.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A shock absorber with a variable damping characteristic, particularly for use in motor vehicles, comprising a hollow cylinder defining an internal space for confinement of at least one damping fluid and having a first end, a second end and an internal surface; a piston rod sealingly extending through one of said ends and into said cylinder; a piston reciprocable by said piston rod and being in sealing engagement with said internal surface to divide said internal space into a first and a second chamber, said piston having at least one passage for the flow of damping fluid between said chambers and a plurality of neighboring bypass channels extending between said chambers; and discrete electrically operated means for individually regulating the flow of damping fluid through said channels.

2. The shock absorber of claim 1, wherein said bypass channels are parallel to each other.

3. The shock absorber of claim 1, wherein said bypass channels are equidistant from the axis of said piston.

4. The shock absorber of claim 3, wherein said bypass channels are equidistant from each other in the circumferential direction of said piston.

5. The shock absorber of claim 1, wherein at least one of said bypass channels has a fluid metering portion and the respective regulating means includes a mobile regulating element for controlling the flow of fluid through said metering portion.

6. The shock absorber of claim 1, wherein each of said regulating means comprises a mobile armature for the respective bypass channel and an energizable coil arranged to move the armature and to thereby change the rate of flow of damping fluid through the respective bypass channel.

7. The shock absorber of claim 6, wherein each of said regulating means further comprises means for energizing and deenergizing the respective coil to thereby effect movements of the corresponding armature to and from positions in which the damping fluid is free to flow through the respective bypass channel.

8. The shock absorber of claim 6, wherein said coils are adjacent one another.

9. The shock absorber of claim 6, wherein each of said regulating means further comprises means for yieldably biasing the respective armature to or from positions in which the respective bypass channel is sealed.

10. The shock absorber of claim 6, wherein said coils are equidistant from the axis of said piston.

11. The shock absorber of claim 10, wherein said coils are equidistant from each other in the circumferential direction of said piston.

12. The shock absorber of claim 1, wherein said piston has at least one first passage for the flow of damping fluid from one of said chambers into the other of said chambers and at least one second passage for the flow of damping fluid from said other chamber into said one chamber.

13. The shock absorber of claim 12, wherein said piston has a plurality of first and a plurality of second passages, one of said second passages being adjacent each of said first passages.

14. The shock absorber of claim 13, wherein each first passage and the adjacent second passage form a pair of neighboring passages and such pairs of neighboring passages are equidistant from the axis of said piston and equidistant from each other in the circumferential direction of said piston.

15. The shock absorber of claim 1, further comprising safety valve means for controlling the flow of damping fluid through said passage.

16. The shock absorber of claim 15, wherein said piston has at least one first passage for the flow of damping fluid from one of said chambers into the other of said chambers and at least one second passage for the flow of damping fluid from said other chamber into said one chamber, said safety valve means including a first safety valve for each first passage and a second safety valve for each second passage, each second safety valve being arranged to open in response to a pressure higher than the pressure at which said first safety valve opens.

17. The shock absorber of claim 16, wherein said other chamber is adjacent said one end of said cylinder.

18. The shock absorber of claim 1, wherein said regulating means comprises a mobile needle-like armature for the respective bypass channel and an energizing coil arranged to move the respective armature relative to the corresponding bypass channel to thereby change the rate of flow of damping fluid by way of such bypass channel.

19. The shock absorber of claim 1, wherein said regulating means comprise a plurality of inductors having coaxial energizable coils.

20. The shock absorber of claim 19, wherein the common axis of said coils coincides with the axis of said piston.

21. The shock absorber of claim 1, wherein said regulating means comprise a plurality of inductors having energizable coils with axes which are inclined with reference to the axis of said piston.

22. The shock absorber of claim 21, wherein the axes of said coils are disposed at right angles to the axis of said piston.

* * * * *